United States Patent
Park

(10) Patent No.: US 12,448,033 B2
(45) Date of Patent: Oct. 21, 2025

(54) MOTOR CONTROL DEVICE FOR STEERING SYSTEM AND MOTOR CONTROL METHOD USING THE SAME

(71) Applicant: HL MANDO CORPORATION, Gyeonggi-do (KR)

(72) Inventor: Jaesang Park, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 152 days.

(21) Appl. No.: 18/374,591

(22) Filed: Sep. 28, 2023

(65) Prior Publication Data

US 2024/0391521 A1   Nov. 28, 2024

(30) Foreign Application Priority Data

May 24, 2023   (KR) .................. 10-2023-0067242

(51) Int. Cl.
    *B62D 5/04*   (2006.01)
(52) U.S. Cl.
    CPC ................. *B62D 5/0493* (2013.01)
(58) Field of Classification Search
    CPC ...... B62D 5/003; B62D 5/046; B62D 5/0484; B62D 5/0487; B62D 5/0493
    See application file for complete search history.

(56) References Cited

U.S. PATENT DOCUMENTS

| | | | |
|---|---|---|---|
| 6,983,817 B2 * | 1/2006 | Katou | B62D 6/10 |
| | | | 180/443 |
| 7,610,133 B2 * | 10/2009 | Nagase | B62D 5/0463 |
| | | | 701/41 |
| 10,300,940 B2 * | 5/2019 | Tsubaki | H02P 29/0241 |
| 11,349,422 B2 * | 5/2022 | Chen | H02P 21/50 |
| 12,054,206 B2 * | 8/2024 | Won | B62D 5/049 |
| 12,202,555 B2 * | 1/2025 | Lee | B62D 5/0484 |
| 2012/0253604 A1 * | 10/2012 | Doray | B62D 7/1581 |
| | | | 701/43 |
| 2016/0001810 A1 * | 1/2016 | Tsubaki | B62D 6/08 |
| | | | 701/42 |
| 2016/0200355 A1 * | 7/2016 | Mori | H02P 21/22 |
| | | | 180/446 |
| 2016/0325777 A1 * | 11/2016 | Mori | H02P 6/085 |
| 2016/0332660 A1 * | 11/2016 | Sasaki | B62D 5/046 |
| 2017/0104437 A1 * | 4/2017 | Suzuki | H02P 29/0241 |
| 2017/0349207 A1 * | 12/2017 | Maeshima | B60L 3/0092 |
| 2018/0194390 A1 * | 7/2018 | Goto | B62D 5/046 |
| 2018/0229761 A1 * | 8/2018 | Fujita | G01L 5/221 |
| 2018/0281850 A1 * | 10/2018 | Mizoguchi | B62D 15/025 |
| 2020/0023887 A1 * | 1/2020 | Sasaki | B62D 5/0493 |
| 2021/0221428 A1 * | 7/2021 | Kudanowski | B62D 5/0403 |

(Continued)

Primary Examiner — Carl C Staubach
(74) Attorney, Agent, or Firm — WOMBLE BOND DICKINSON (US) LLP

(57) ABSTRACT

Disclosed herein are a motor control device for a steering system and a motor control method using the same. The motor control device includes a dual winding steering motor unit generating a steering force and a steering reaction force and including a first driving module formed of a first winding and a second driving module formed of a second winding, and a first electronic control unit controlling an operation of the first driving module, and a second electronic control unit controlling an operation of the second driving module, on the basis of steering information obtained by a driver's steering wheel manipulation.

16 Claims, 7 Drawing Sheets

(56) References Cited

U.S. PATENT DOCUMENTS

| | | | |
|---|---|---|---|
| 2022/0111889 A1* | 4/2022 | Sato | B62D 5/046 |
| 2022/0281519 A1* | 9/2022 | Won | B62D 5/049 |
| 2024/0375705 A1* | 11/2024 | Fujimoto | B62D 6/007 |
| 2024/0421740 A1* | 12/2024 | Park | H02P 25/22 |

* cited by examiner (a)

(b)

(a)

(b)

MOTOR CONTROL DEVICE FOR STEERING SYSTEM AND MOTOR CONTROL METHOD USING THE SAME

TECHNICAL FIELD

The present disclosure relates to a motor control device for a steering system and a motor control method using the same and, more particularly, to a motor control device for a steering system capable of controlling a dual motor in the steering system having the dual motor and a motor control method using the same.

BACKGROUND

Recently, various electric power steering systems have been commonly used, and technologies related to autonomous driving of a vehicle are being actively developed.

Thus, requirements for a redundancy electric power steering system are increasing. In order to implement redundancy in the electric power steering system, a steering control device using two or more control units is used.

The control units of the steering control device may be configured to simultaneously perform steering control. Alternatively, one of the two control units may perform steering control. When the control unit is out of order, the other control unit may perform steering control.

In such a steering control device including two or more control units, it is preferable that the control units exchange information with each other. This is because, when a failure occurs in any one of the control units, the failure cause of the control unit may be checked using information stored in the other control unit. The information exchange may be performed through a vehicle communication line such as Controller Area Network (CAN).

On the other hand, when a failure occurs due to a short in the control unit, an internally flowing current is generated, so that a back electromotive force induced in the motor is generated. The back electromotive force additionally generates torque ripple in the failure mode of the motor where braking torque is generated.

Such torque ripple may affect the rotation of a steering wheel when a driver operates the steering wheel, thus preventing desired rotation from being easily performed.

In order to prevent the torque ripple, there has been proposed a method of adding a control circuit. However, the method of adding the control circuit is problematic in that it is not easy to apply the method due to cost and size.

SUMMARY

In view of the above, the present disclosure provides a motor control device for a steering system and a motor control method using the same, in which torque ripple can be reduced by compensating through a control unit controlling the other motor, when one motor or a control unit for controlling the operation of the motor in the steering system having a dual motor is out of order.

The present disclosure provides a motor control device for a steering system, the motor control device including a dual winding steering motor unit generating a steering force and a steering reaction force, and including a first driving module formed of a first winding and a second driving module formed of a second winding; and a first electronic control unit controlling an operation of the first driving module, and a second electronic control unit controlling an operation of the second driving module, on the basis of steering information obtained by a driver's steering wheel manipulation. Any one of the first electronic control unit and the second electronic control unit determines a failure mode on the basis of failure information when the failure information about any one of the driving modules controlled by the corresponding electronic control unit is acquired, and then transmits the failure mode to a remaining electronic control unit, and the remaining electronic control unit selects a compensation value for the failure mode to control an operation of a remaining driving module according to the compensation value.

Further, the first electronic control unit may include a first motor controller calculating an output value of the first driving module on the basis of the steering information; a first switching unit transmitting the output value transmitted from the first motor controller to the first driving module as an electric signal; and a first memory unit storing a lookup table for a plurality of failure modes so as to select the compensation value.

Further, the second electronic control unit may include a second motor controller calculating an output value of the second driving module on the basis of the steering information; a second switching unit transmitting the output value transmitted from the second motor controller to the second driving module as an electric signal; and a second memory unit storing a lookup table for a plurality of failure modes so as to select the compensation value.

Further, the first electronic control unit and the second electronic control unit may exchange the failure information with each other through CAN communication.

Further, the first motor controller may include a first PI controller, the first motor controller may calculate an output value to control the first driving module according to the compensation value, and the first PI controller may receive the compensation value, perform a feedback control to calculate an error, and then transmit the error to the first motor controller.

The second motor controller may include a second PI controller, the second motor controller may calculate an output value to control the second driving module according to the compensation value, and the second PI controller may receive the compensation value, perform a feedback control to calculate an error, and then transmit the error to the second motor controller.

The first switching unit may include a first PWM control unit converting the output value transmitted from the first motor controller into a PWM (Pulse Width Modulation) signal; a first gate driver generating an output signal on the basis of the PWM signal; and a first inverter converting the output signal transmitted from the first gate driver into an electric signal.

Further, the second switching unit may include a second PWM control unit converting the output value transmitted from the second motor controller into a PWM (Pulse Width Modulation) signal; a second gate driver generating an output signal on the basis of the PWM signal; and a second inverter converting the output signal transmitted from the second gate driver into an electric signal.

The present disclosure provides a motor control method of a steering system including a dual winding steering motor unit that includes a first driving module formed of a first winding and a second driving module formed of a second winding, a first electronic control unit controlling an operation of the first driving module, and a second electronic control unit controlling an operation of the second driving module, the method including acquiring failure information about any one of the driving modules by any one of the first electronic control unit and the second electronic control unit; determining a failure mode on the basis of the failure information; transmitting information of the failure mode to a remaining electronic control unit; and selecting a compensation value for the failure mode to control an operation of a remaining driving module according to the compensation value, by the remaining electronic control unit.

Further, the first electronic control unit may include a first motor controller calculating an output value of the first driving module on the basis of the steering information or the compensation value; and a first switching unit transmitting the output value to the first driving module as an electric signal, and the second electronic control unit may include a second motor controller calculating an output value of the second driving module on the basis of the steering information or the compensation value; and a second switching unit transmitting the output value to the second driving module as an electric signal Further, in the acquiring the failure information, the first electronic control unit may acquire the failure information of the first driving module or the first switching unit.

Further, in the transmitting the information of the failure mode to the remaining electronic control unit, the first electronic control unit may transmit the information of the failure mode to the second electronic control unit.

Further, the second electronic control unit may further include a second memory unit storing a lookup table for a plurality of failure modes so as to select the compensation value. In the controlling the operation, the second electronic control unit may select the compensation value based on the second memory unit.

The second motor controller may include a second PI controller, the controlling the operation may include receiving the compensation value, performing a feedback control in the second PI controller to calculate an error, and calculating an output value that is to be transmitted to the second switching unit using the error; and transmitting the output value to the second switching unit to generate an electric signal for controlling the second driving module.

In the acquiring the failure information, the second electronic control unit may acquire the failure information of the second driving module or the first switching unit.

In the transmitting the failure information to the remaining electronic control unit, the second electronic control unit may transmit the failure information to the first electronic control unit.

The first electronic control unit may further include a first memory unit storing a lookup table for a plurality of failure modes so as to select the compensation value. In the controlling the operation, the first electronic control unit may select the compensation value based on the first memory unit.

Further, the first motor controller may include a first PI controller, and the controlling the operation may include receiving the compensation value, performing a feedback control in the first PI controller to calculate an error, and calculating an output value that is to be transmitted to the first switching unit using the error; and transmitting the output value to the first switching unit to generate an electric signal for controlling the first driving module.

Details of other embodiments are included in the detailed description and drawings.

Advantageous Effects

A motor control device for a steering system and a motor control method using the same according to the present disclosure have the following effects.

First, even if any one driving module in a dual winding motor is out of order or any one of two control units is out of order to cause torque ripple, a safe control is guaranteed by compensating to reduce the torque ripple in the normally driving control unit.

Second, the output of a motor can be normally maintained by reducing torque ripple, so that a driver cannot feel uncomfortable in operating a steering wheel even if some failure occurs.

DETAILED DESCRIPTION

Figure 1:
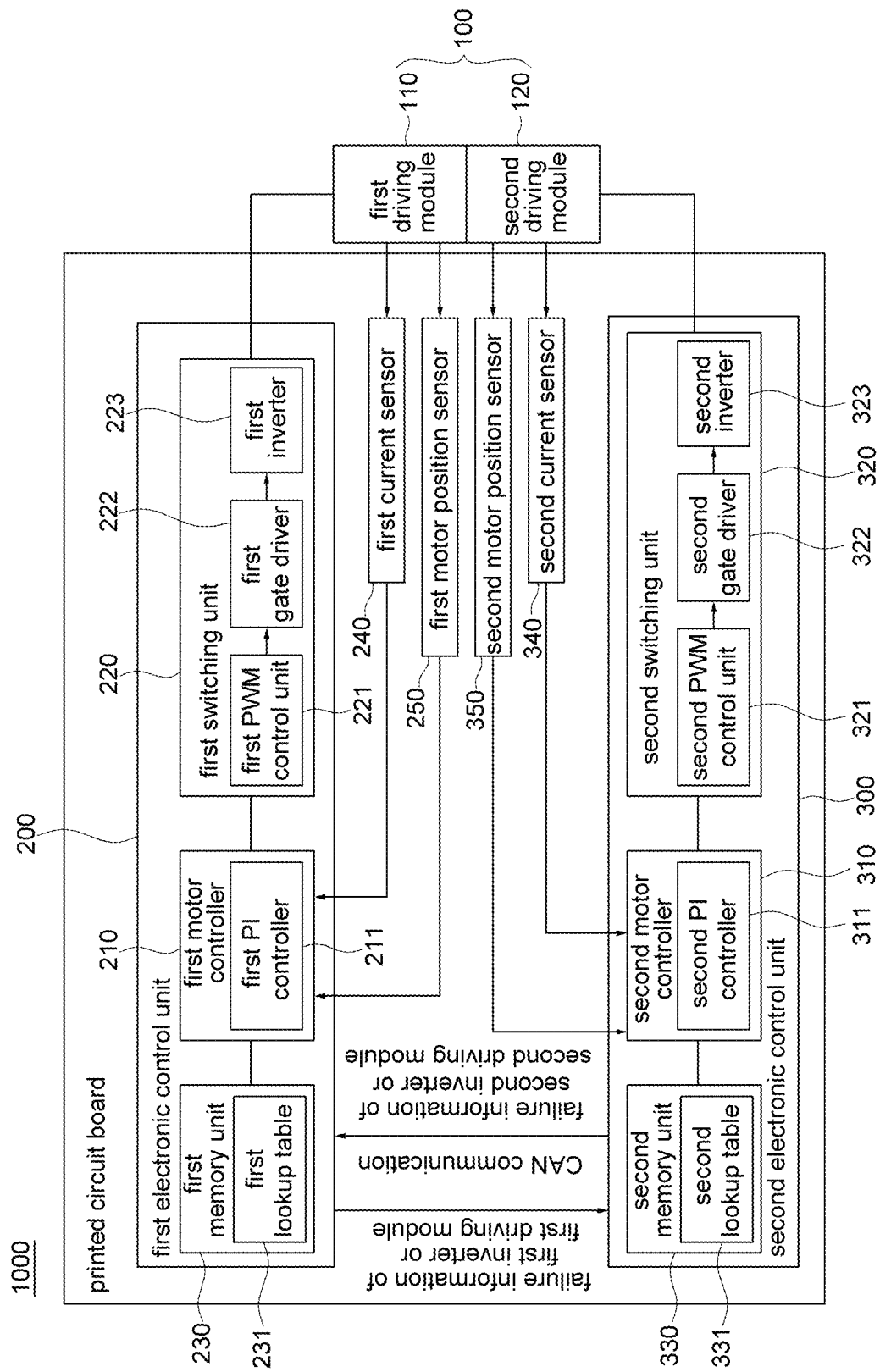
FIG. 1 shows the configuration of a motor control device for a steering system according to an embodiment of the present disclosure.

Hereinafter, embodiments of the present disclosure will be described in detail such that those skilled in the art can easily practice the present disclosure. However, the present disclosure may be implemented in various ways without being limited to particular embodiments described herein.

It is to be noted that the drawings are schematic and are not drawn to scale. Furthermore, the size or shape of components shown in the drawings may be exaggerated for the clarity and convenience of description. Any dimensions are merely illustrative and not restrictive. In addition, the same reference numerals are used throughout the drawings to designate the same or similar components.

The disclosure specifically represents an ideal embodiment of the present disclosure. Thus, various variations of the diagram are expected. Therefore, the embodiment is not limited to a specific shape, and also covers the modification of the shape by manufacturing.

Hereinafter, a motor control device for a steering system and a motor control method using the same according to the present disclosure will be described in detail with reference to FIGS. 1 to 7.

First, the motor control device for the steering system according to an embodiment of the present disclosure will be described in detail with reference to FIG. 1. The motor control device 1000 for the steering system includes a dual winding steering motor unit 100, a first electronic control unit 200, and a second electronic control unit 300.

The dual winding steering motor unit 100 generates a steering force and a steering reaction force. The dual winding steering motor unit 100 includes a first driving module 110 formed of a first winding and a second driving module 120 formed of a second winding.

The first electronic control unit 200 controls the operation of the first driving module 110 on the basis of steering information obtained by a driver's steering wheel manipulation. The second electronic control unit 300 controls the operation of the second driving module 120 on the basis of steering information obtained by a driver's steering wheel manipulation.

The first electronic control unit 200 and the second electronic control unit 300 exchange information with each other through CAN communication. The first electronic control unit 200 detects the failure of the first driving module 110, and the second electronic control unit 300 detects the failure of the second driving module 120. The first electronic control unit 200 and the second electronic control unit 300 exchange the detected failure with each other through the CAN communication.

When the first electronic control unit 200 detects failure information about the first driving module 110 to determine a failure mode and transmits the information to the second electronic control unit 300, the second electronic control unit 300 selects a compensation value for the failure mode transmitted from the first electronic control unit 200 and then controls the operation of the second driving module 120 based on the compensation value.

Likewise, when the second electronic control unit 300 detects failure information about the second driving module 120 to determine a failure mode and transmits the information to the first electronic control unit 200, the first electronic control unit 200 selects a compensation value for the failure mode transmitted from the second electronic control unit 300 and then controls the operation of the first driving module 110 based on the compensation value.

The first electronic control unit 200 includes a first motor controller 210, a first switching unit 220, and a first memory unit 230.

The first motor controller 210 calculates an output value required for the operation of the first driving module 110 on the basis of the steering information. The first motor controller 210 is composed of a control circuit. On the other hand, when a failure occurs in the second driving module 120, an output value required for the operation of the first driving module 110 is calculated on the basis of the compensation value.

The first motor controller 210 includes a first PI controller 211. When the first electronic control unit 200 receives the failure mode of the second driving module 120, a compensation value is selected to reduce torque ripple that is to be generated due to a failure in the second driving module 120.

The first PI controller 211 calculates an error through a feedback control using the compensation value so that the first motor controller 210 receiving the compensation value selected by the first electronic control unit 200 may calculate an output value on the basis of the compensation value.

The first motor controller 210 calculates the output value using the error calculated and transmitted by the first PI controller 211.

The first switching unit 220 receives the output value from the first motor controller 210. The first switching unit 220 converts the output value into an electric signal for controlling the operation of the first driving module 110. When the first switching unit 220 transmits the converted electric signal to the first driving module 110, the operation of the first driving module 110 is controlled by the electric signal.

The first switching unit 220 includes a first PWM control unit 221, a first gate driver 222, and a first inverter 223.

The first PWM control unit 221 converts the output value transmitted from the first motor controller 210 to a PWM (Pulse Width Modulation) signal. Meanwhile, when torque ripple due to the failure of the second driving module 120 should be corrected, the first PWM control unit 221 converts an output value transmitted from the first motor controller 210 into the PWM signal.

The PWM signal converted by the first PWM control unit 221 is transmitted to the first gate driver 222.

The first gate driver 222 generates the PWM signal transmitted from the first PWM control unit 221 as an output signal. The first gate driver 222 transmits the generated output signal to the first inverter 223.

The first gate driver 222 serves to detect the failure of the first driving module 110 or the first inverter 223 and obtain failure information. A health check function is embedded in the first gate driver 222. The first gate driver 222 may detect the failure of the first driving module 110 or the first inverter 223 through the health check function, acquire the failure information, and then determine the failure mode.

For example, a failure such as a three-phase short, phase to phase, or phase to neutral occurs in the first driving module 110, or a failure such as a single FET short or a double FET short in the first inverter 223 is detected, and failure information is obtained to determine a failure mode.

The first gate driver 222 acquires the failure information and transmits the failure mode determined through the failure information to the second electronic control unit 300.

The first inverter 223 converts the output signal transmitted from the first gate driver 222 into an electric signal. The electric signal converted by the first inverter 223 is transmitted to the first driving module 110. The operation of the first driving module 110 is controlled in response to the electric signal transmitted from the first inverter 223.

The first memory unit 230 stores a lookup table 231 for a plurality of failure modes. As described above, there are various failure causes for the first driving module 110. The failure may be a failure occurring in the first driving module 110 itself or a failure occurring in the first inverter 223.

Further, there may be a plurality of failure causes of the first driving module 110 or the first inverter 223. As such, the lookup table 231 prepared such that each failure cause is set as the failure mode and the compensation value is selected for each failure mode is stored in the first memory unit 230.

When the information of the failure mode for the second driving module 120 is transmitted to the first electronic control unit 200, the first electronic control unit 200 selects the compensation value on the basis of the lookup table 231 stored in the first memory unit 230. To be more specific, the first electronic control unit 200 compares the received information of the failure mode with the lookup table stored in the first memory unit 230 and then selects an appropriate compensation value.

The second electronic control unit 300 includes a second motor controller 310, a second switching unit 320, and a second memory unit 330.

The second motor controller 310 calculates an output value required for the operation of the second driving module 120 on the basis of the steering information. Similarly to the first motor controller 210, the second motor controller 310 is composed of a control circuit. On the other hand, when a failure occurs in the first driving module 110, an output value required for the operation of the second driving module 120 is calculated on the basis of the compensation value.

The second motor controller 310 includes a second PI controller 311. When the second electronic control unit 300 receives the failure mode of the first driving module 110, a compensation value is selected to reduce torque ripple that is to be generated due to a failure in the first driving module 110.

The second PI controller 311 calculates an error through a feedback control using the compensation value so that the second motor controller 310 receiving the compensation value selected by the second electronic control unit 300 may calculate an output value on the basis of the compensation value.

The second motor controller 310 calculates the output value using the error calculated and transmitted by the second PI controller 311.

Similarly to the second motor controller 310, the second PI controller 311 is also composed of a control circuit. When the failure of the first driving module 110 is not detected, an output value capable of controlling the operation of the second driving module 120 is calculated through the second motor controller 310 using steering information. When the failure of the first driving module 110 is detected, the second motor controller 310 and the second PI controller 311 calculate an output value capable of controlling the operation of the second driving module 120 using the compensation value.

The second switching unit 320 receives the output value from the second motor controller 310. The second switching unit 320 converts the output value into an electric signal for controlling the operation of the second driving module 120. When the second switching unit 320 transmits the converted electric signal to the second driving module 120, the operation of the second driving module 120 is controlled by the electric signal.

The second switching unit 320 includes a second PWM control unit 321, a second gate driver 322, and a second inverter 323.

The second PWM control unit 321 converts the output value transmitted from the second motor controller 310 to a PWM signal. Meanwhile, when torque ripple due to the failure of the first driving module 110 should be corrected, the second PWM control unit 321 converts an output value transmitted from the second motor controller 310 into the PWM signal.

The PWM signal converted by the second PWM control unit 321 is transmitted to the second gate driver 322.

The second gate driver 322 generates the PWM signal transmitted from the second PWM control unit 321 as an output signal. The second gate driver 322 transmits the generated output signal to the second inverter 323.

The second gate driver 322 serves to detect the failure of the second driving module 120 or the second inverter 323 and obtain failure information. A health check function is embedded in the second gate driver 322. The second gate driver 322 may detect the failure of the second driving module 120 or the second inverter 323 through the health check function, acquire the failure information, and then determine the failure mode.

For example, a failure such as a three-phase short, phase to phase, or phase to neutral occurs in the second driving module 120, or a failure such as a single FET short or a double FET short in the second inverter 323 is detected, and failure information is obtained to determine a failure mode.

The second gate driver 322 acquires the failure information and transmits the failure mode determined through the failure information to the first electronic control unit 200.

The second inverter 323 converts the output signal transmitted from the second gate driver 322 into an electric signal. The electric signal converted by the second inverter 323 is transmitted to the second driving module 120. The operation of the second driving module 120 is controlled in response to the electric signal transmitted from the second inverter 323.

The second memory unit 330 stores a lookup table 331 for a plurality of failure modes. As described above, there are various failure causes for the first driving module 110. The failure may be a failure occurring in the first driving module 110 itself or a failure occurring in the first inverter 223.

Further, there may be a plurality of failure causes of the first driving module 110 or the first inverter 223. Since this has been described in detail when the first memory unit 230 is described, a detailed description for the second memory unit 330 will be omitted.

When the information of the failure mode for the first driving module 110 is transmitted to the second electronic control unit 300, the second electronic control unit 300 selects the compensation value on the basis of the lookup table 331 stored in the second memory unit 330. To be more specific, the second electronic control unit 300 compares the received information of the failure mode with the lookup table stored in the second memory unit 330 and then selects an appropriate compensation value.

The first electronic control unit 200 and the second electronic control unit 300 are provided on a printed circuit board 10. Although not shown in the drawing, the first electronic control unit 200 and the second electronic control unit 300 are provided on upper and lower surfaces of the printed circuit board 10 to be opposite to each other.

Meanwhile, the motor control device 1000 for the steering system includes current sensors 240 and 340, and motor position sensors 250 and 350.

The current sensors 240 and 340 include a first current sensor 240 and a second current sensor 340. The first current sensor 240 is provided on the printed circuit board 10. The first current sensor 240 is electrically connected to the printed circuit board 10 and the first electronic control unit 200.

The first current sensor 240 measures current that is consumed by the first driving module 110. A measurement value measured by the first current sensor 240 is transmitted to the first electronic control unit 200. In detail, the measurement value is transmitted to the first motor controller 210 and the first PI controller 211.

The first PI controller 211 compares a current value (measured current value) measured by the first current sensor 240 with a current value (target current value) based on the compensation value, calculates an error while performing the feedback control, and then transmits the error to the first motor controller 210. The first motor controller 210 calculates the output value using the current value measured by the first current sensor 240 and the error transmitted from the first PI controller 211.

The second current sensor 340 is provided on the printed circuit board 10. The second current sensor 340 is electrically connected to the printed circuit board 10 and the second electronic control unit 300.

The second current sensor 340 measures current consumed by the second driving module 120. The measurement value measured by the second current sensor 340 is transmitted to the second electronic control unit 300. In detail, the measurement value is transmitted to the second motor controller 301 and the second PI controller 311.

The second PI controller 311 compares a current value (measured current value) measured by the second current sensor 340 with a current value (target current value) based on the compensation value, calculates an error while performing the feedback control, and then transmits the error to the second motor controller 310. The second motor controller 310 calculates the output value using the current value measured by the second current sensor 340 and the error transmitted from the second PI controller 311.

The motor position sensors 250 and 350 include a first motor position sensor 250 and a second motor position sensor 350. The first motor position sensor 250 is provided on the printed circuit board 10. The first motor position sensor 250 is electrically connected to the printed circuit board 10 and the first electronic control unit 200.

The first motor position sensor 250 serves to measure the motor rotation angle of the first driving module 110. When the failure of the second driving module 120 is detected and the first electronic control unit 200 selects a compensation value in the first memory unit 230, the first motor controller 210 performs the feedback control using the measurement value of the first motor position sensor 250 when calculating the output value, thus calculating the error. Further, the output value based on the compensation value is calculated taking into account the calculated error.

The second motor position sensor 350 is provided on the printed circuit board 10. The second motor position sensor 350 is electrically connected to the printed circuit board 10 and the second electronic control unit 300.

The second motor position sensor 350 serves to measure the motor rotation angle of the second driving module 120. When the failure of the first driving module 110 is detected and the second electronic control unit 300 selects a compensation value in the second memory unit 340, the second motor controller 310 performs the feedback control using the measurement value of the second motor position sensor 350 when calculating the output value, thus calculating the error. Further, the output value based on the compensation value is calculated taking into account the calculated error.

In the above description, the process of calculating the output value based on the measurement value of each of the current sensors 240 and 340 and the process of calculating the output value based on the measurement value of each of the motor position sensors 250 and 350 have been separately described. However, this is only for the description of the configuration. In practice, the output value is calculated only when both the measurement value of each of the current sensors 240 and 340 and the measurement value of each of the motor position sensors 250 and 350 are delivered.

Hereinafter, the motor control method of the steering system according to an embodiment of the present disclosure will be described with reference to FIGS. 2 to 7.

During the operation of the steering system, a process in which one of the first electronic control unit 200 and the second electronic control unit 300 detects the failure of the dual winding motor 100 is performed.

Figure 2:
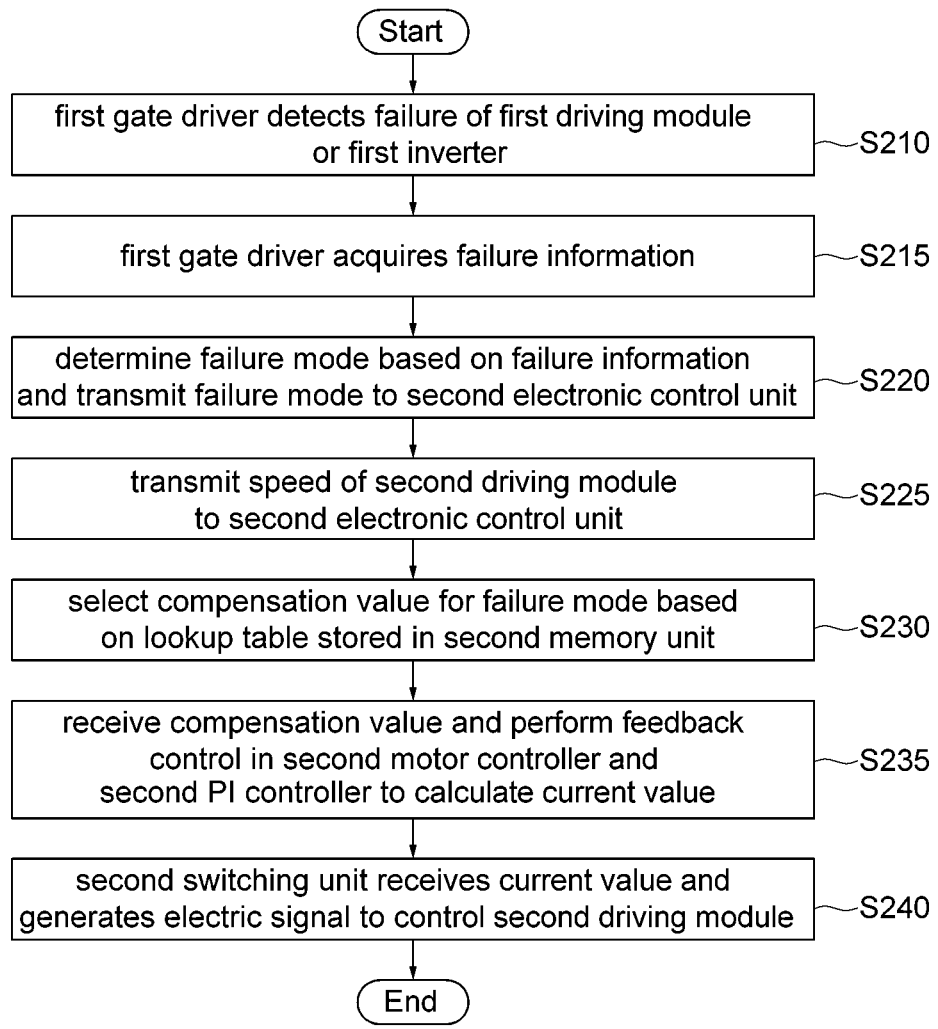
FIGS. 2 to 5 are block diagrams showing a motor control method using the motor control device for the steering system of FIG. 1.

First, a method in which the first electronic control unit 200 detects the failure of the dual winding motor 100 and controls the motor while reducing torque ripple will be described with reference to FIGS. 2 and 3.

The first electronic control unit 200 detects that the failure has occurred in the first driving module 110 or the first inverter 223 (step S210). To be more specific, the first gate driver 222 detects that the failure has occurred in the first driving module 110 or the first inverter 223.

When the first gate driver 222 detects the failure in the first driving module 110 or the first inverter 223, the failure information is acquired and a type of failure mode is determined based on the failure information (step S215).

The first electronic control unit 200 transmits the failure mode determined by the first gate driver 222 through CAN communication to the second electronic control unit 300 (step S220).

The second electronic control unit 300 receives information about the speed of the second driving module 120 from the second driving module 120 (step S225)

Figure 3:
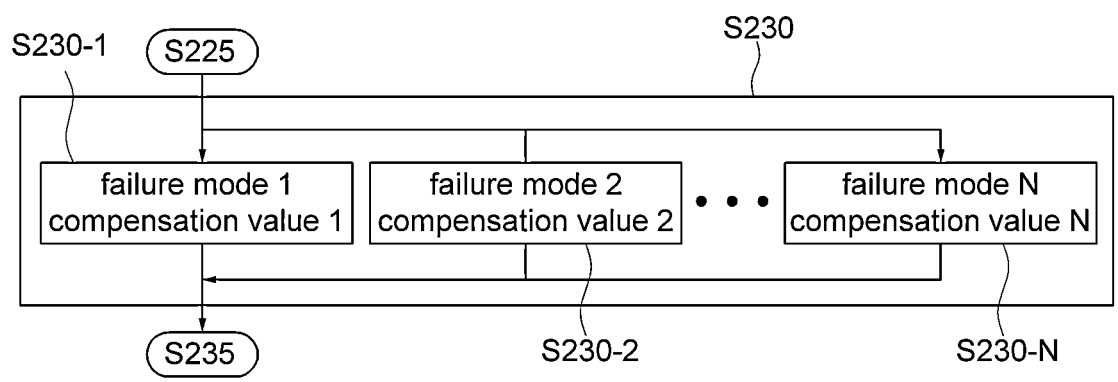

The second electronic control unit 300 compares the information of the failure mode received from the first electronic control unit 200 with the lookup table 231-1, 231-2, or 231-N stored in the second memory unit 330, and selects the compensation value based on the compared result (see FIG. 3, step S230).

The second electronic control unit 300 receives the measurement value of the second current sensor 340 and the measurement value of the second motor position sensor 350.

The second motor controller 310 and the second PI controller 311 receive the compensation value, the information about the speed of the second driving module 120, the measurement value of the second current sensor 340, and the measurement value of the second motor position sensor 350, and calculate the output value for the second driving module 120 while performing the feedback control (step S235).

The output value calculated by the second motor controller 310 and the second PI controller 311 is transmitted to the second switching unit 320.

The output value is converted into the PWM signal in the second PWM control unit 321 to be transmitted to the second gate driver 322, is converted into the output signal in the second gate driver 322 to be transmitted to the second inverter 323, and is converted into the electric signal in the second inverter 323 (step S240).

The second inverter 323 transmits the electric signal to the second driving module 120 to control the second driving module 120 according to the compensation value. Thus, even if torque ripple is generated due to the failure of the first driving module 110, the second driving module 120 may prevent an abnormal output from occurring due to the torque ripple.

Figure 4:
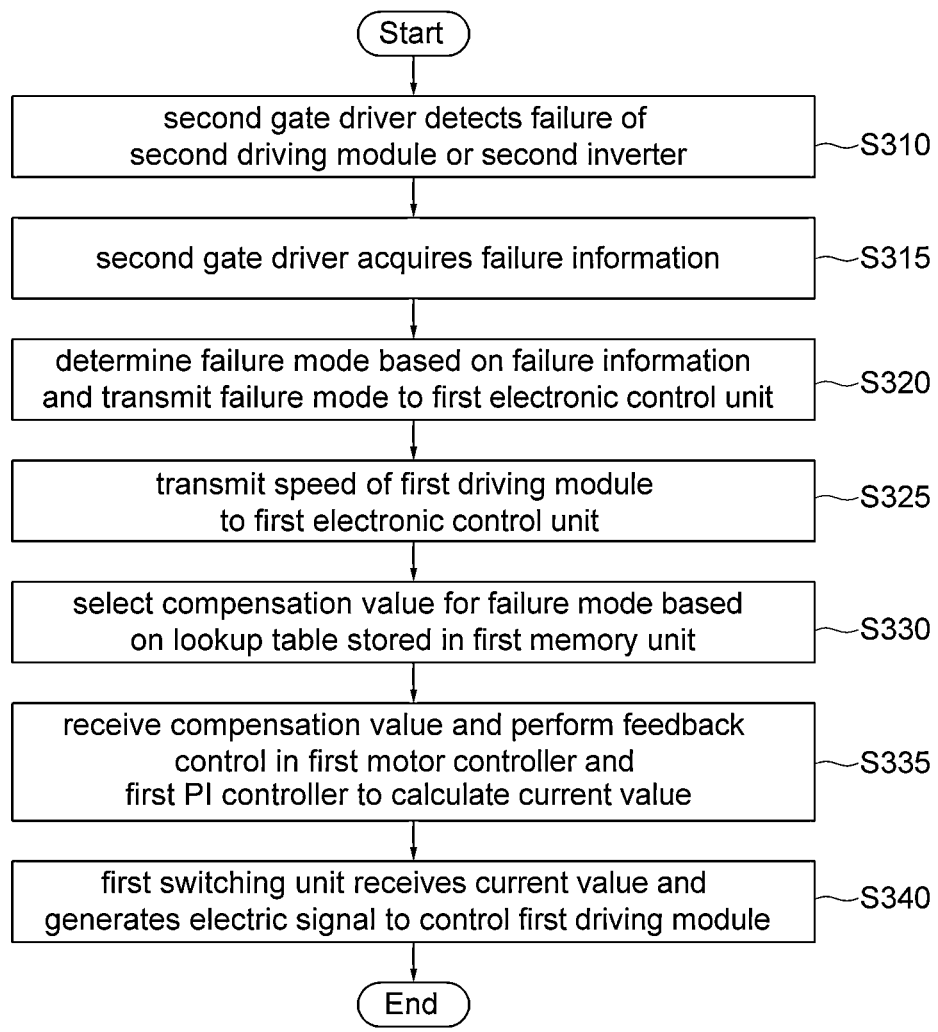
Figure 5:
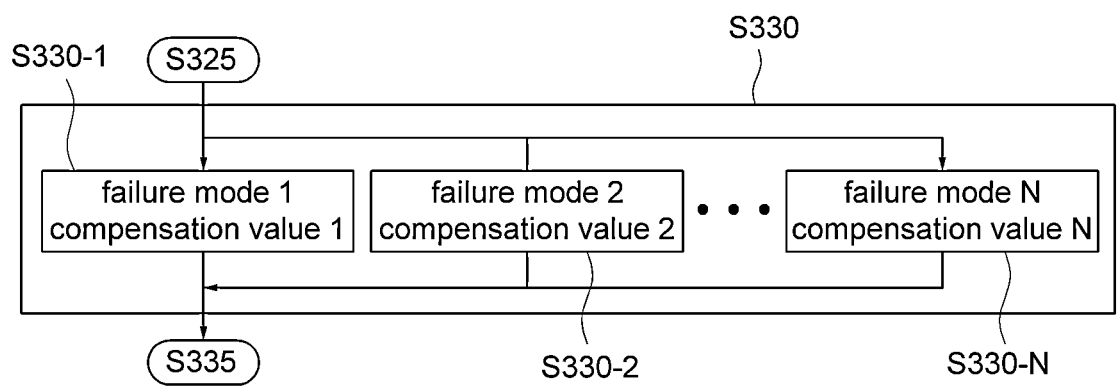

FIGS. 4 and 5 show a method in which the second electronic control unit 300 detects the failure of the dual winding motor 100 and controls the motor while reducing the torque ripple.

The second electronic control unit 300 detects that the failure occurs in the second driving module 120 or the second inverter 323 (step S310). To be more specific, the second gate driver 322 detects that the failure occurs in the second driving module 120 or the second inverter 323 (step S310).

When the second gate driver 322 detects the failure in the second driving module 120 or the second inverter 323, the failure information is acquired and a type of failure mode is determined based on the failure information (step S315).

The second electronic control unit 300 transmits the failure mode determined by the second gate driver 322 through CAN communication to the first electronic control unit 200 (step S320).

The first electronic control unit 200 receives information about the speed of the first driving module 110 from the first driving module 110 (step S325)

The first electronic control unit 200 compares the information of the failure mode received from the second electronic control unit 300 with the lookup table 331-1, 331-2, or 331-N stored in the first memory unit 230, and selects the compensation value based on the compared result (see FIG. 5, step S330).

The first electronic control unit 200 receives the measurement value of the first current sensor 240 and the measurement value of the first motor position sensor 250.

The first motor controller 210 and the first PI controller 211 receive the compensation value, the information about the speed of the first driving module 110, the measurement value of the first current sensor 240, and the measurement value of the first motor position sensor 250, and calculate the output value for the first driving module 110 while performing the feedback control (step S335).

The output value calculated by the first motor controller 210 and the first PI controller 211 is transmitted to the first switching unit 220.

The output value is converted into the PWM signal in the first PWM control unit 221 to be transmitted to the first gate driver 222, is converted into the output signal in the first gate driver 222 to be transmitted to the first inverter 223, and is converted into the electric signal in the first inverter 223 (step S340).

The first inverter 223 transmits the electric signal to the first driving module 110 to control the first driving module 110 according to the compensation value. Thus, even if torque ripple is generated due to the failure of the second driving module 120, the first driving module 110 may prevent an abnormal output from occurring due to the torque ripple.

Figure 6:
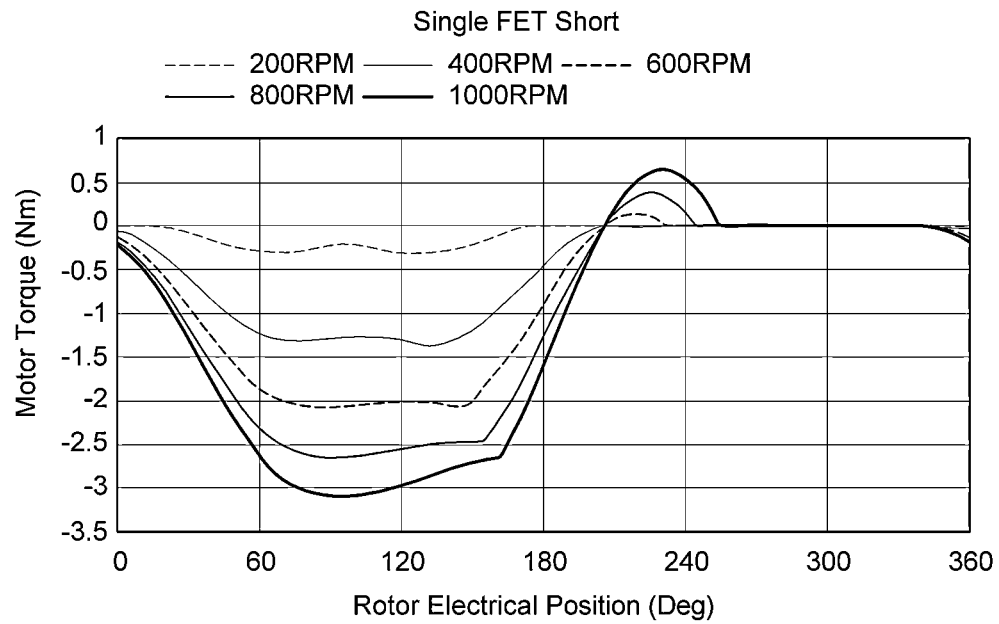
FIG. 6 shows an example (graph) of a lookup table.
Figure 6:
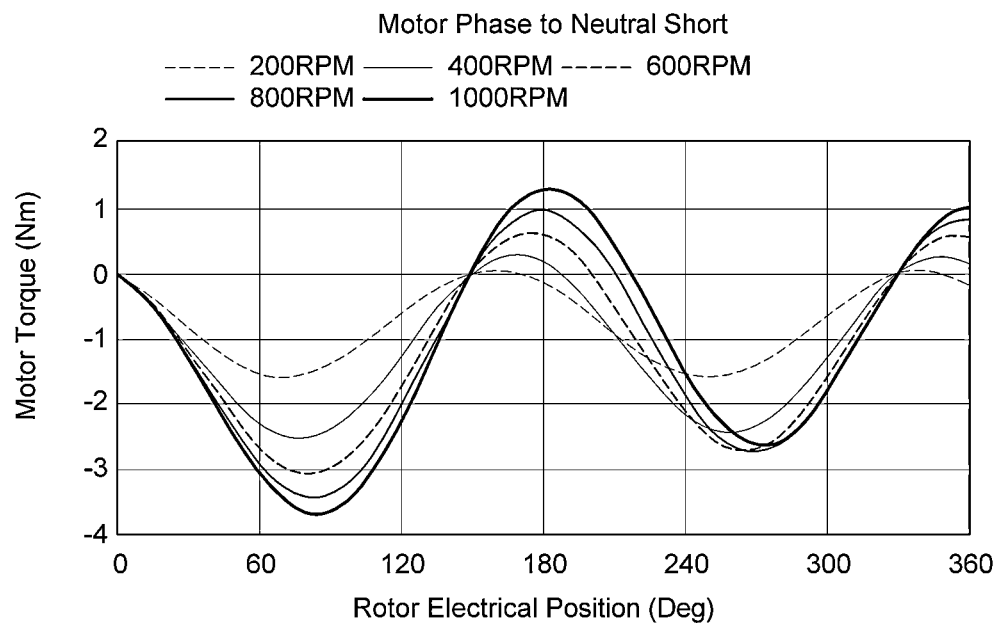

FIG. 6 illustrates the lookup table for selecting the compensation value according to the present disclosure. FIG. 6A shows the lookup table when a short occurs in the inverter, and FIG. 6B shows the lookup table when a short occurs in a neutral conductor of the motor.

Referring to FIG. 6, the motor torque value according to the position of the motor for each speed of the dual winding motor 100 in each failure mode is stored as a graph. Thus, when each of the first electronic control unit 200 and the second electronic control unit 300 receives the failure-mode information and the measured value of the motor speed, the electronic control unit compares them with the lookup table shown in FIG. 6 and selects an appropriate compensation value (appropriate torque value).

Referring to FIG. 6, data corresponding to all speeds of the motor is not stored in the look-up table. However, the compensation value may be selected using data stored in the look-up table in an interpolation method even if the data is not data stored in the look-up table.

FIG. 6 illustrates lookup tables for two cases. However, without being limited thereto, lookup tables according to various failure modes are stored in the first memory unit 230 and the second memory unit 330, respectively.

Figure 7:
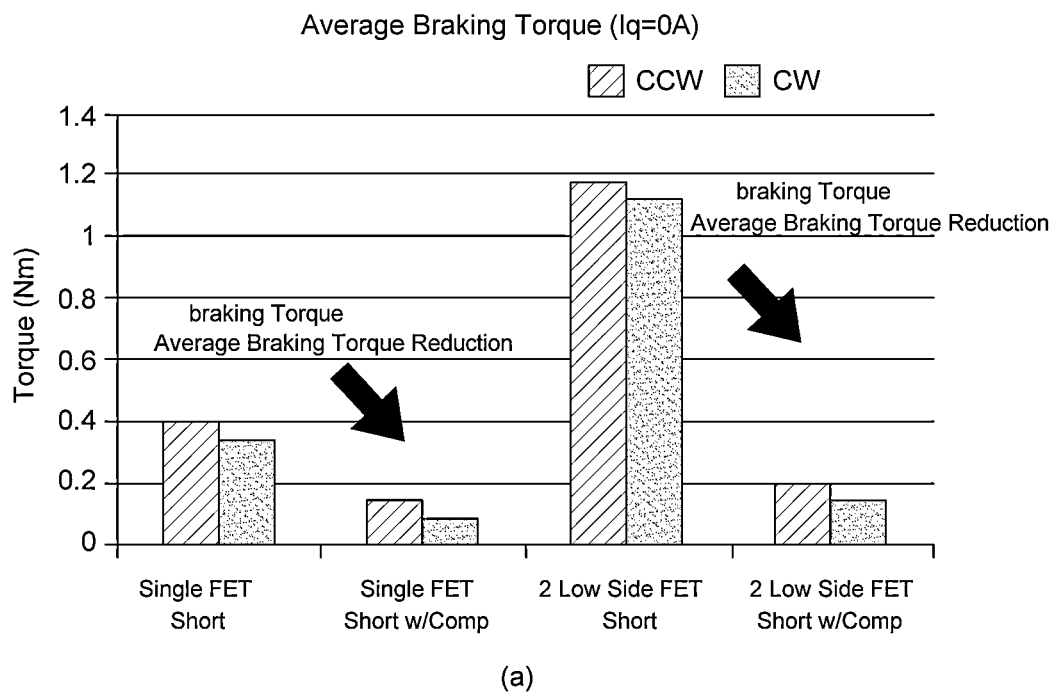
FIG. 7 is a graph showing experimental results for the control method of FIGS. 2 to 5.
Figure 7:
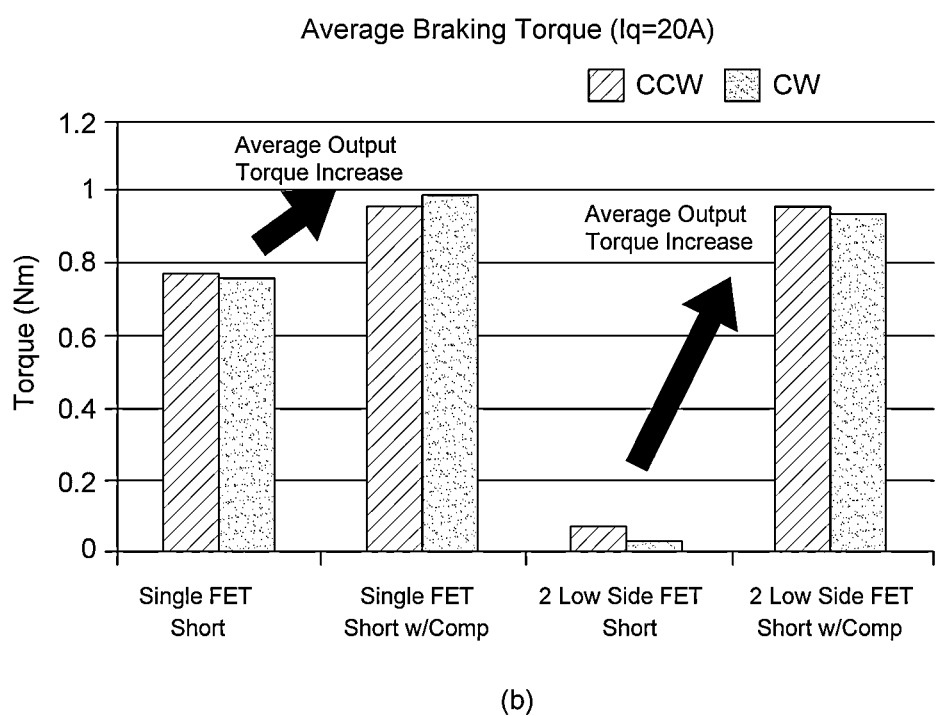

FIG. 7 is a graph showing the test result for the control in which the compensation value is selected and the compensation is performed based on the selected compensation value according to the present disclosure.

Referring to FIG. 7A, it can be seen that the torque ripple of a certain value has occurred due to the failure in a component (inverter) that controls the dual winding motor. Since current is not transmitted under normal conditions in the case of FIG. 7A, the measurement value of torque should be 0 in the inverter. However, it can be seen that the torque in the inverter is reduced to approach 0 by selecting the compensation value and then compensating for the torque ripple according to the present disclosure.

Referring to FIG. 7B, it can be seen that the torque ripple of a certain value is reduced due to the failure in the component (inverter) that controls the dual winding motor. Since current of 20 A is transmitted under normal conditions in the case of FIG. 7B, the torque value of about 1 Nm should be measured in the inverter. In this connection, the torque value is reduced due to the torque ripple caused by the failure.

According to the present disclosure, it can be seen that the output (torque) of the inverter is increased to approach a normal range by selecting the compensation value for the torque ripple and then performing compensation based on the selected compensation value.

The above description is merely exemplary description of the technical scope of the present disclosure, and it will be understood by those skilled in the art that various changes and modifications can be made without departing from original characteristics of the present disclosure.

Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

[Detailed Description of Main Elements]

| | |
|---|---|
| 1000: motor control device for steering system | 230: first memory unit |
| 10: printed circuit board | 240: first current sensor |
| 100: dual winding motor | 250: first motor position sensor |
| 110: first driving module | 300: second electronic control unit |
| 120: second driving module | 310: second motor controller |
| 200: first electronic control unit | 311: second PI controller |
| 210: first motor controller | 320: second switching unit |
| 211: first PI controller | 321: second PWM control unit |
| 220: first switching unit | 322: second gate driver |
| 221: first PWM control unit | 323: second inverter |
| 222: first gate driver | 330: second memory unit |
| 223: first inverter | 340: second current sensor |
| | 350: second motor position sensor |

What is claimed is:

1. A motor control device for a steering system, the motor control device comprising:
    a dual winding steering motor unit generating a steering force and a steering reaction force, and comprising a first driving module formed of a first winding and a second driving module formed of a second winding; and
    a first electronic control unit controlling an operation of the first driving module, and a second electronic control unit controlling an operation of the second driving module, on the basis of steering information obtained by a driver's steering wheel manipulation,
    wherein any one of the first electronic control unit and the second electronic control unit determines a failure mode on the basis of failure information when the failure information about any one of the driving modules controlled by the corresponding electronic control unit is acquired, and then transmits the failure mode to a remaining electronic control unit,
    wherein the remaining electronic control unit selects a compensation value for the failure mode to control an operation of a remaining driving module according to the compensation value,
    wherein the first electronic control unit comprises a first memory unit storing a lookup table for a plurality of failure modes to select the compensation value, and
    wherein the second electronic control unit comprises a second memory unit storing a lookup table for a plurality of failure modes to select the compensation value.

2. The motor control device of claim 1, wherein the first electronic control unit comprises:
    a first motor controller calculating an output value of the first driving module on the basis of the steering information; and
    a first switching unit transmitting the output value transmitted from the first motor controller to the first driving module as an electric signal.

3. The motor control device of claim 2, wherein the second electronic control unit comprises:
a second motor controller calculating an output value of the second driving module on the basis of the steering information; and
a second switching unit transmitting the output value transmitted from the second motor controller to the second driving module as an electric signal.

4. The motor control device of claim 1, wherein the first electronic control unit and the second electronic control unit exchange the failure information with each other through CAN communication.

5. The motor control device of claim 2, wherein the first motor controller comprises a first PI controller,
the first motor controller calculates an output value to control the first driving module according to the compensation value, and
the first PI controller receives the compensation value, performs a feedback control to calculate an error, and then transmits the error to the first motor controller.

6. The motor control device of claim 3, wherein the second motor controller comprises a second PI controller,
the second motor controller calculates an output value to control the second driving module according to the compensation value, and
the second PI controller receives the compensation value, performs a feedback control to calculate an error, and then transmits the error to the second motor controller.

7. The motor control device of claim 2, wherein the first switching unit comprises:
a first PWM control unit converting the output value transmitted from the first motor controller into a PWM (Pulse Width Modulation) signal;
a first gate driver generating an output signal on the basis of the PWM signal; and
a first inverter converting the output signal transmitted from the first gate driver into an electric signal.

8. The motor control device of claim 3, wherein the second switching unit comprises:
a second PWM control unit converting the output value transmitted from the second motor controller into a PWM (Pulse Width Modulation) signal;
a second gate driver generating an output signal on the basis of the PWM signal; and
a second inverter converting the output signal transmitted from the second gate driver into an electric signal.

9. A motor control method of a steering system comprising a dual winding steering motor unit that comprises a first driving module formed of a first winding and a second driving module formed of a second winding, a first electronic control unit controlling an operation of the first driving module, and a second electronic control unit controlling an operation of the second driving module, the method comprising:
acquiring failure information about any one of the driving modules by any one of the first electronic control unit and the second electronic control unit;
determining a failure mode on the basis of the failure information;
transmitting information of the failure mode to a remaining electronic control unit; and
selecting a compensation value for the failure mode to control an operation of a remaining driving module according to the compensation value, by the remaining electronic control unit,
wherein the second electronic control unit further comprises:
a second memory unit storing a lookup table for a plurality of failure modes to select the compensation value, and
in the controlling the operation, the second electronic control unit selects the compensation value based on the second memory unit, and
wherein the first electronic control unit further comprises:
a first memory unit storing a lookup table for a plurality of failure modes to select the compensation value, and
in the controlling the operation, the first electronic control unit selects the compensation value based on the first memory unit.

10. The motor control method of claim 9, wherein the first electronic control unit comprises:
a first motor controller calculating an output value of the first driving module on the basis of steering information obtained by a driver's steering wheel manipulation or the compensation value; and
a first switching unit transmitting the output value to the first driving module as an electric signal, and
the second electronic control unit comprises:
a second motor controller calculating an output value of the second driving module on the basis of steering information obtained by a driver's steering wheel manipulation or the compensation value; and
a second switching unit transmitting the output value to the second driving module as an electric signal.

11. The motor control method of claim 10, wherein, in the acquiring the failure information, the first electronic control unit acquires the failure information of the first driving module or the first switching unit.

12. The motor control method of claim 9, wherein, in the transmitting the information of the failure mode to the remaining electronic control unit, the first electronic control unit transmits the information of the failure mode to the second electronic control unit.

13. The motor control method of claim 10, wherein the second motor controller comprises a second PI controller, and
the controlling the operation comprises:
receiving the compensation value, performing a feedback control in the second PI controller to calculate an error, and calculating an output value that is to be transmitted to the second switching unit using the error; and
transmitting the output value to the second switching unit to generate an electric signal for controlling the second driving module.

14. The motor control method of claim 10, wherein, in the acquiring the failure information, the second electronic control unit acquires the failure information of the second driving module or the first switching unit.

15. The motor control method of claim 9, wherein, in the transmitting the failure information to the remaining electronic control unit, the second electronic control unit transmits the failure information to the first electronic control unit.

16. The motor control method of claim 10, wherein the first motor controller comprises a first PI controller, and
the controlling the operation comprises:
receiving the compensation value, performing a feedback control in the first PI controller to calculate an error, and calculating an output value that is to be transmitted to the first switching unit using the error; and
transmitting the output value to the first switching unit to generate an electric signal for controlling the first driving module.

* * * * *